United States Patent
Lee et al.

(10) Patent No.: US 6,222,882 B1
(45) Date of Patent: Apr. 24, 2001

(54) ADAPTIVE MOTION ESTIMATION METHOD OF A LUMINANCE SIGNAL

(75) Inventors: Shi-hwa Lee; Jae-seob Shin, both of Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/350,141

(22) Filed: Nov. 29, 1994

(30) Foreign Application Priority Data

Jan. 31, 1994 (KR) .................................................. 94-1752

(51) Int. Cl.$^7$ ....................................................... H04N 7/18
(52) U.S. Cl. ................................ 375/240.16; 375/240.17
(58) Field of Search ............................... 348/416, 409, 348/419, 411, 699, 700, 415; 375/240.16, 240.17

(56) References Cited

U.S. PATENT DOCUMENTS

| | | | |
|---|---|---|---|
| 5,157,732 | * 10/1992 | Ishii | 348/699 |
| 5,162,907 | * 11/1992 | Keating et al. | 348/416 |
| 5,361,105 | * 11/1994 | Iu | 348/416 |
| 6,097,832 | 8/2000 | Guillotel et al. | 382/107 |

FOREIGN PATENT DOCUMENTS 4-196794  7/1992  (JP) .

93-703651  11/1993  (KR) .

* cited by examiner

Primary Examiner—Andy Rao
(74) Attorney, Agent, or Firm—Leydig, Voit & Mayer, Ltd (57) ABSTRACT

Correct motion estimation is performed by preventing an adverse effect due to the variation of lighting conditions when a motion estimation is performed in a motion image device. The method for estimating a motion by dividing an image frame represented by a luminance signal into a plurality of predetermined size blocks and detecting the most similar block in a previous frame with a block in a current frame and producing a corresponding movement distance as a motion vector, includes the steps of: producing a mean value of the luminance signal with regard to a block of the current frame; producing a mean value of the luminance signal with regard to a block to which a motion estimation of the previous frame is applied; compensating the luminance signal of the block to which the motion estimation of the previous frame is applied such that the two mean values have the same level; and selecting a block having the minimum sum of differences between luminance signals of each pixel, with regard to the block of the current frame and the block to which a motion estimation of the previous frame is applied, and producing the movement distance between these as a motion vector. Thus, a correct motion estimation can be made even when the light source is varied or a luminance signal is varied due to the moving of an object.

2 Claims, 6 Drawing Sheets

ADAPTIVE MOTION ESTIMATION METHOD OF A LUMINANCE SIGNAL

BACKGROUND OF THE INVENTION

The present invention relates to a motion estimating method in motion image coding, and more particularly, to a method for performing a correct motion estimation by preventing the adverse effects due to variations in lighting conditions.

A motion image coding system has actually been developed from a differential pulse code modulation (DPCM) system to a motion compensated interframe coding (MCIC) system, and has recently been extended to a model based coding (MBC) system or an object oriented coding (OOC) system.

While only a predicted error is transmitted in the DPCM system, motion information with a predicted error is transmitted in the MCIC system. In the case of MBC or OOC, motion information and shape information with a predicted error can be transmitted.

The coding by the MCIC system is generally performed in units of blocks having a predetermined size (for example, the size of one block is 4×4 pixels). A motion vector of each block and an error signal between a target image and a reconstructed image obtained by motion compensation, are transmitted.

In coding by the OOC system, a background is separated from an object and the motion of the object is analyzed so as to produce parameters. Here, the background represents the region where no motion exists between adjacent frames, and the object represents the region where a motion exists between adjacent frames.

In a conventional motion estimator, a full search method, a three-step search method and other methods have been used for generating a motion vector. In full searching, a block which is most similar to a block of the current image, is searched in a predetermined search window of the previous image, and then the distance between the current block and the searched block is determined as a motion vector (x,y).

The three-step search has the advantage that quick searching can be performed, but has the disadvantage that an inaccurate motion vector is produced compared with the full search method. Therefore, the full search method is used much more often.

However, an accurate estimation by these methods is difficult to obtain if a luminance signal is changed even by a simple two-dimensional motion of an object. Also, if a light source is changed with no motion, an inaccurate motion vector may be produced. The generation of this inaccurate motion vector results in a large amount of error data in an encoder according to the MCIC system, thereby increasing the quantity of data to be encoded. In addition, in an encoder according to the MBC system, the number of groups is increased and the number of intra-blocks is increased, thereby increasing the quantity of data to be encoded.

SUMMARY OF THE INVENTION

Accordingly, the object of the present invention is to provide a motion estimating method for estimating a motion vector correctly, regardless of a change of a luminance signal.

To attain the above object, there is provided a method for estimating a motion according to the present invention by dividing an image frame represented by luminance signals into a plurality of predetermined size blocks, detecting the most similar block in a previous frame with a block in a current frame and producing a corresponding movement distance as a motion vector, comprising the steps of:

producing a mean value of the luminance signal with regard to a block of the current frame;

producing a mean value of the luminance signal with regard to a block to which a motion estimation of the previous frame is applied;

compensating the luminance signal of the block to which the motion estimation of the previous frame is applied such that the two mean values have the same level; and selecting a block having the minimum sum of differences between luminance signals of each pixel, with regard to the block of the current frame and the block to which a motion estimation of the previous frame is applied, respectively, and producing the moving distance between these blocks as a motion vector.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
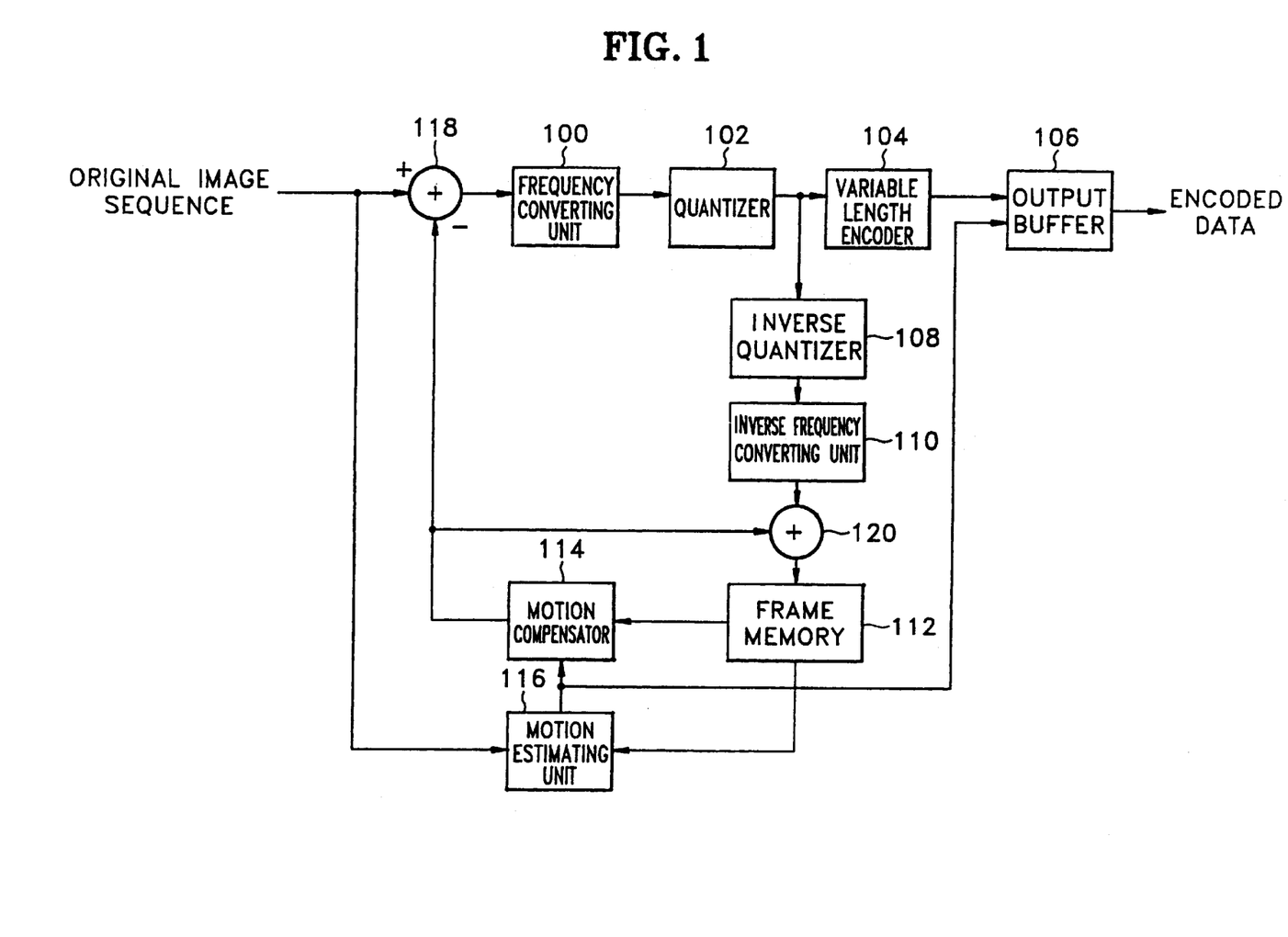
FIG. 1 is a block diagram of a motion image encoder according to a conventional MCIC system.

In FIG. 1, reference numeral 100 represents a frequency converter, reference numeral 102 represents a quantizer, reference numeral 104 represents a variable-length encoder, reference numeral 108 represents an inverse quantizer, reference numeral 110 represents an inverse frequency converter, reference numeral 112 represents a frame memory, reference numeral 114 represents a motion compensator, and reference numeral 116 represents a motion estimator.

In the encoder shown in FIG. 1, a motion vector generated through motion estimating unit 116 is used for reconstructing an image with regard to the previous image in motion compensator 114. The reconstructed image is compared with a target image to be encoded, and a difference image is generated.

For the generated difference image, the duplication of two-dimensional data is eliminated by a discrete cosine transform (DCT) operation in frequency converting unit 100 and a quantization is made on this according to the target quantity of bit generation in quantizer 102. Then, even a statistical duplication is eliminated by an entropy coding operation in variable-length encoder 104.

At this time, the quantized data is again applied to inverse quantizer 108 and inverse frequency converter 110, and used for reconstructing an image which is currently being encoded. This reconstructed image is used as a reference image when estimating a motion in the subsequent image coding. The reference numeral 106 denotes an output buffer, the reference numeral 118 denotes a subtracter, and the reference numeral 120 denotes an adder.

Assuming that the block being currently encoded is represented as $x_t[n]$ for $0 \leq n \leq N$, the reference block which has been searched by the full search method is represented as $x_{t-1}[n]$ for $0 \leq n \leq N$ and the reference block which has been searched by the search method according to the present invention is represented as $x'_{t-1}[n]$ for $0 \leq n \leq N$, the input data $x[n]$ for $0 \leq n \leq N$ on which a DCT is performed when the full search method is used, and the DCT input data $x'[n]$ for $0 \leq n \leq N$ when using the method according to the present invention, will be as follows.

$$x_t[n] - x_{t-1}[n] = \Delta x[n]$$
$$x_t[n] - x'_{t-1}[n] = \Delta x'[n] + \alpha \quad (1)$$

for $0 \leq n \leq N$. Here, $\alpha$ is a compensating luminance signal value applied to all the pixels of the reference block.

If the inequality $$\sum_{n=0}^{N-1} \Delta x[n] < \sum_{n=0}^{N-1} (\Delta x'[n] + \alpha)$$

is true, then $\Delta x[n]$ is used as input data of DCT, and otherwise, only $\Delta x'[n]$ is used as the input data of DCT.

The expression $\Delta x'[n]$, newly introduced by the present invention, does not increase the data quantity, even if a compensating value $\alpha$ is not separately applied to a decoder in motion estimation, compared with the case that a DCT operation is performed on $\Delta x'[n]+\alpha$. In equations (1), the DCT value $C(k)$ with regard to $\Delta x'[n]$ can be computed as follows.

$$C(k) = DCT(\Delta X'[n])$$
$$= DCT(\Delta X'[n]\alpha) - DCT(\alpha)$$
$$= \sum_{n=0}^{N-1} 2(x_t[n])\cos\left[\frac{\pi}{2N}k(2n\ 1)\right] -$$
$$\sum_{n=0}^{N-1} 2\alpha\cos\left[\frac{\pi}{2N}k(2n\ 1)\right]$$

At this time, since the data to be encoded is restricted to the data corresponding to the case of k=0, by virtue of DCT($\alpha$), and most of the data corresponding to the case of k=0 has already been processed by the coding of DCT($\Delta x'[n]+\alpha$). Therefore, there is no increment in data to be encoded due to DCT($\alpha$).

Figure 2:
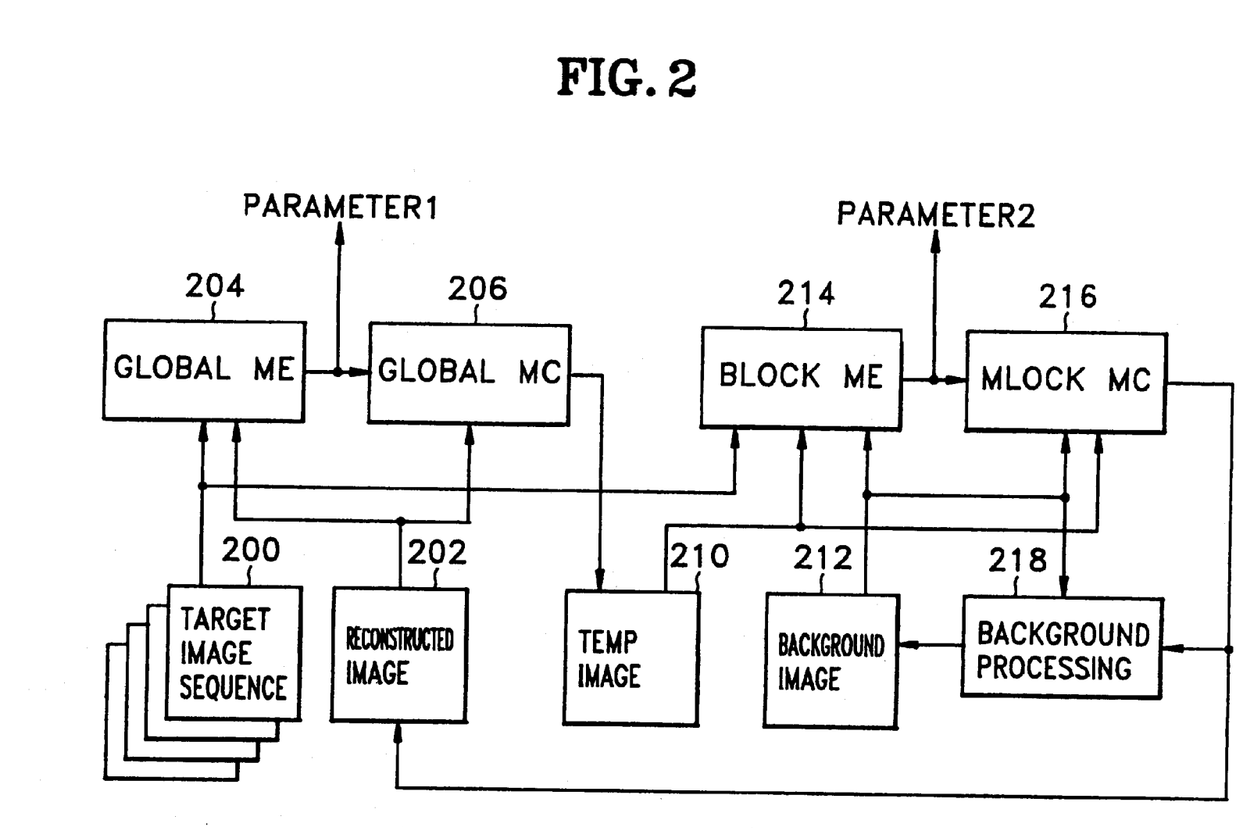
FIG. 2 is a block diagram of a motion image encoder according to a conventional OOC system.

FIG. 2 is a block diagram of a motion image encoder according to an OOC system.

The encoder shown in FIG. 2, is divided broadly into a global motion estimating unit and a local motion estimating unit. In FIG. 2, reference numeral 200 represents a target image source for receiving a target image to be encoded, and reference numeral 202 represents a reconstructed image memory for storing a reference image which has been lately reconstructed. Reference numeral 204 represents a global motion estimator, and reference numeral 206 represents a global motion compensator. Reference numeral 210 represents a temporal image memory for storing a temporary image reconstructed in motion compensator 206, reference numeral 214 represents a local motion estimator, and reference numeral 216 represents a local motion compensator. Reference numeral 218 represents a background image processor, and reference numeral 212 represents a background image memory.

The operation of the apparatus shown in FIG. 2 will be explained as follows.

If the size of an analysis object which has been extracted among the area in which motion estimation can be performed in a reference image is larger than a predetermined size, global motion estimator 204 encodes the shape and the motion of the analysis object. A parameter 1 generated at this time is transferred to a decoder (not shown). Global motion compensator 206 compensates the reference image using the size and the motion information of the extracted analysis object and produces a temporary image.

Local motion estimator 214 performs a small motion processing, a background processing, and a processing of the area in which motion estimation cannot be performed, in accordance with a processing mode and with reference to the target image provided from target image source 200, the temporary image provided from temporary image memory 210, and the background image provided from background image memory 212. A parameter 2 generated at this time is transferred to the decoder.

Local motion compensator 216 constructs a final reconstructed image by performing a proper reconstructive processing in accordance with a processing mode of each analysis object, and the constructed final image is transmitted to reconstructed image memory 202 in order to be used as a reference image during the processing for the subsequent target image. The final image is also transmitted to background image processor 218 in order to manage the background image. Background image processor 218 compensates and manages the background image.

The encoder shown in FIG. 2 has a structure such that the image to be encoded is compared with the previous reference image to detect the region in which a motion occurs, that a motion analysis is made on the detected region by the unit of a small block, and that an encoding is performed by the unit of a group composed of adjacent blocks having the same motion vectors.

For each group, the transmitted information is composed of initial position information, motion information and shape information. In this structure, there can be a block to which reference cannot be made in the previous image. This block is called an intra-block. Since a motion vector cannot be obtained in this block, the content of this block should directly be encoded and represents a relatively large quantity of information compared with the blocks in which motion estimation cam be performed in a reference image.

The application of the present invention to the apparatus shown in FIG. 2 results in different characteristics from that to the apparatus shown in FIG. 1. In relatively small (for example, 4×4) basic blocks, adjacent blocks having the same motion vector are classified into one group, and an encoding is performed by the unit of the classified group. For the respective groups having a block, position information, motion information, and shape information are encoded. Accordingly, in the encoding method of the apparatus shown in FIG. 2, the best way to reduce the rate of bit generation is to reduce the number of groups by maximizing the number of adjacent blocks having the same motion. However, there is a restriction in reducing the number of groups if a motion vector is generated simply by estimating a motion in the previous image as the conventional method. This is because the luminance values of an object and the periphery of the object are changed in accordance with the moving of the object in an image. In addition, even for the stationary object, the luminance value is changed due to the variation of the light.

Accordingly, when the luminance signal application method proposed by the present invention is used, a motion can be correctly searched in any condition, so the block having the same motion component and a different luminance signal from the adjacent block can be classified into the same group, which results in reducing the information quantity to be encoded. Here, if a transform coding such as DCT is not used, an application value used in the luminance signal application should be transmitted to a decoder. However, the increment of the information to be transmitted due to this value is less than the decrement due to the luminance signal application, which leads to an overall reduction of the information to be transmitted.

Figure 3:
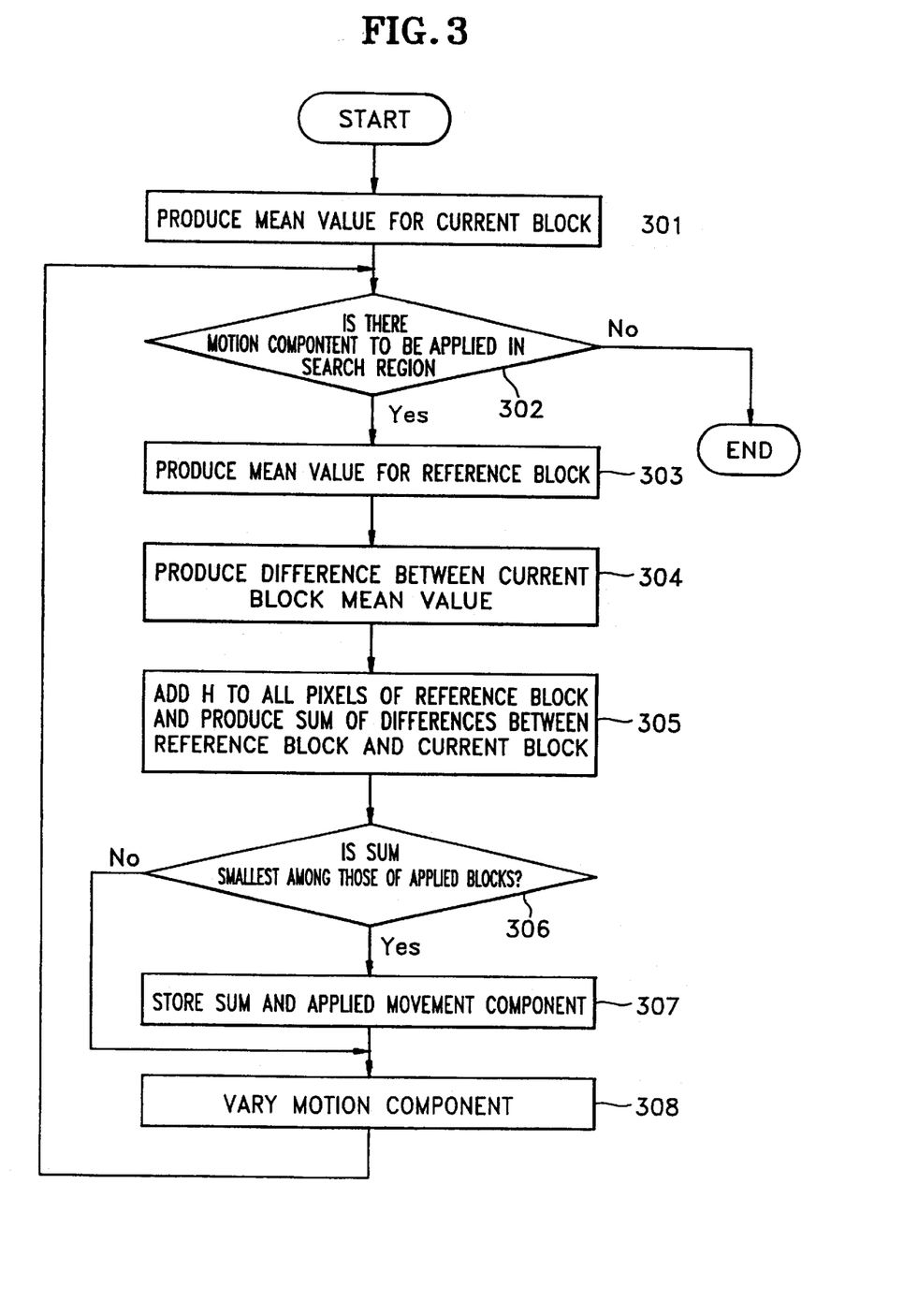
FIG. 3 is a flow chart illustrating an example of a motion estimating method of the present invention being applied to the motion image encoder shown in FIG. 1.

FIG. 3 is a flow chart illustrating an example of a motion estimating method of the present invention being applied to the apparatus shown in FIG. 1. First, a mean value of a luminance signal is produced with regard to the current block (step 301).

It is checked whether or not a motion estimation has been finished with regard to all the blocks in a search window (step 302). If so, the most appropriate one among the produced motion vectors is determined as a motion vector.

If a motion estimation has not been finished in a search window, a mean value of luminance signal for a reference block is produced (step 303), and the difference (H) between the mean value of the current block and that of the reference block (step 304) is produced.

After the pixel values of the reference block is compensated by the produced value (H) of step 304, the sum SUM of the difference between the pixel value of the compensated reference block and that of respective current block is produced (step 305).

The minimum value SUM_MINIMUM among the SUMs thus far produced by application of another motion component to the current block is compared with the SUM produced in step 305 by application of the current motion component to the current block (step 306).

When the SUM value is lower than SUM_MINIMUM, SUM is substituted for SUM_MINIMUM and the motion component of that time is stored (step 307). Next, for application of the motion component which has not been applied, the motion component is changed and then the process advances to step 302 so as to repeatedly perform the above operation (step 308).

Figure 4:
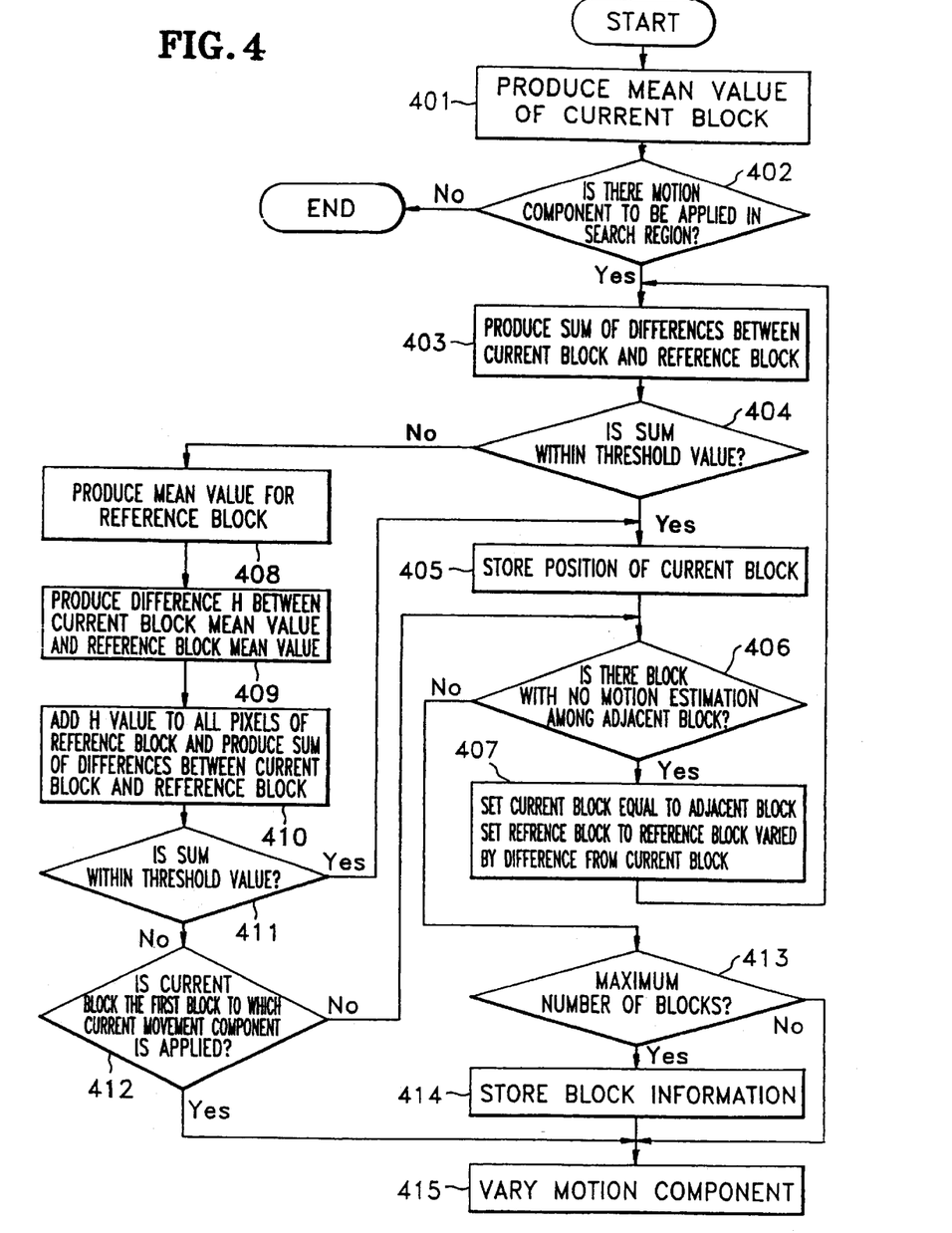
FIG. 4 is a flow chart illustrating an example of a motion estimating method of the present invention being applied to the motion image encoder shown in FIG. 2.

FIG. 4 is a flow chart illustrating an example of a motion estimating method of the present invention being applied to the apparatus shown in FIG. 2. First, the mean value of the current block to be encoded should be produced (step 401).

It is checked whether or not a motion estimation has been completed for all the blocks in a search window. If so, the motion estimation is finished. The information of the motion component produced at this time, and the position information of the blocks which are determined as one group are produced (step 402).

Produced is the sum SUM of the difference between the pixel value of the current block and that of the reference block to which a motion applies (step 403). It is checked whether this SUM is higher than a predetermined threshold value (TH) or not. If the SUM is higher than the threshold value, the position information of the current block is stored, so as to be determined as one group having the same motion component (step 405).

It is checked, whether there is a block in which no motion estimation is performed, among the adjacent blocks in the current group (step 406). The block in which no motion estimation is performed is assigned to a current block and a reference block is determined by applying the previous motion component to the block, and then the process jumps to step 403 (step 407).

If the sum SUM of the differences between the current block and the reference block is not higher than the threshold value, the mean value of the reference block is produced (step 408). The difference (H) between the mean value of the current block and the mean block of the reference value is produced (step 409) and this difference is applied to the each pixel of the reference block to control such that the mean value of the reference block is the same as the mean value of the current block, and the sum SUM' of the differences between the pixel value of the compensated reference block and that of the current block, is produced.

It is determined whether or not the sum SUM' is higher than the threshold value (TH), in step 404, and if so, the process is advanced to step 405 so as to store the information of the current block and then to advance to step 406 (step 411).

If the sum SUM' is not higher than the threshold value (TH) in step 411, a determination is made whether the current block is the block to which the current motion component is first applied (step 412). If the current block is the first applied block, the process is advanced to step 413 so as to apply another motion component to the current block. However, if the current block is not the first applied block, the process is advanced to step 406 so as to determine whether the adjacent block exists and to successively perform the motion estimation.

Figure 5:
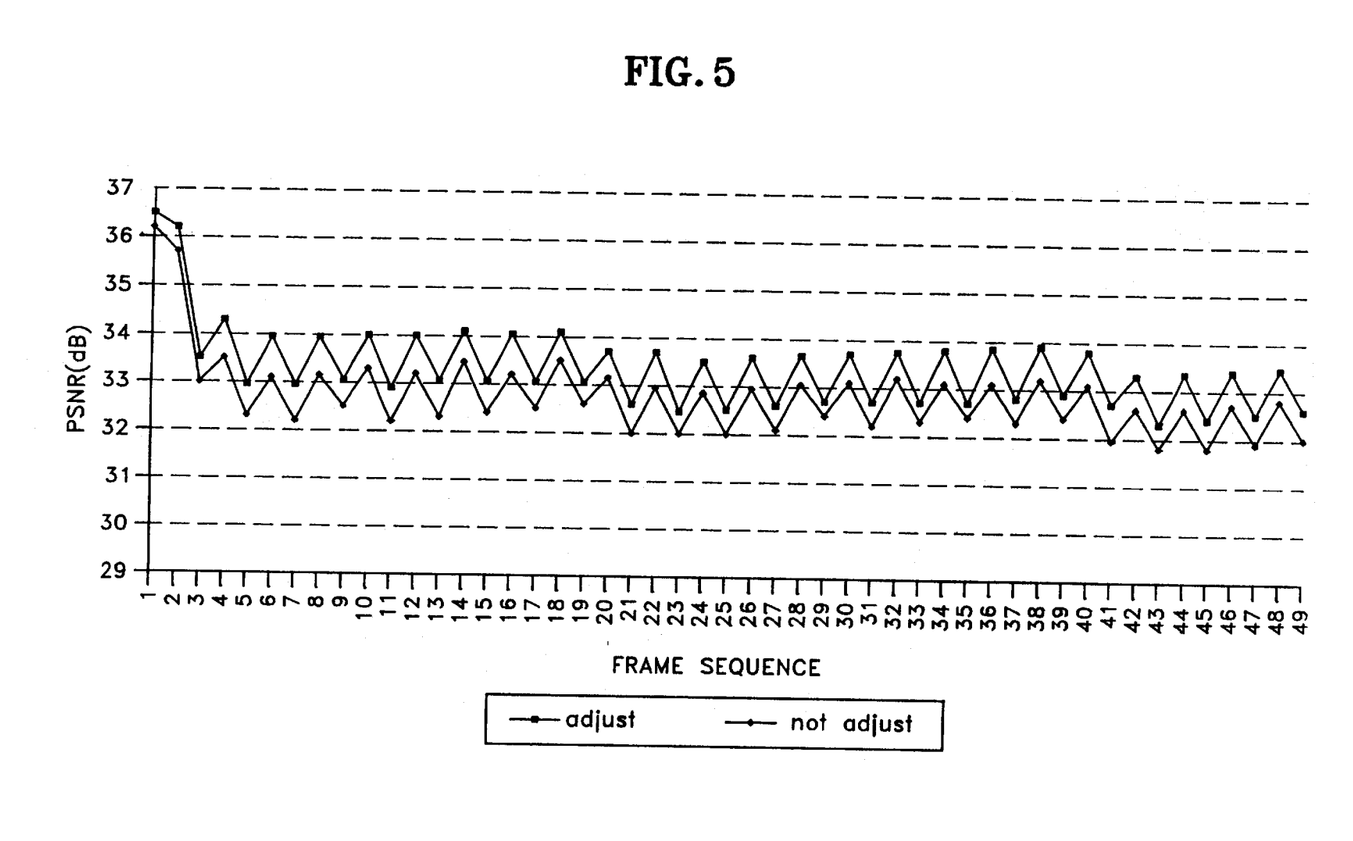
FIG. 5 illustrates an image quality of a restored image which is adjusted according to the motion estimating method of the present invention, compared with that which is not adjusted, to the apparatus shown in FIG. 2.

FIG. 5 illustrates an image quality of a restored image which is adjusted according to the motion estimating method of the present invention compared with that which is not adjusted, to the apparatus shown in FIG. 2. The image quality is represented by the peak signal-to-noise ratio (PSNR).

Figure 6:
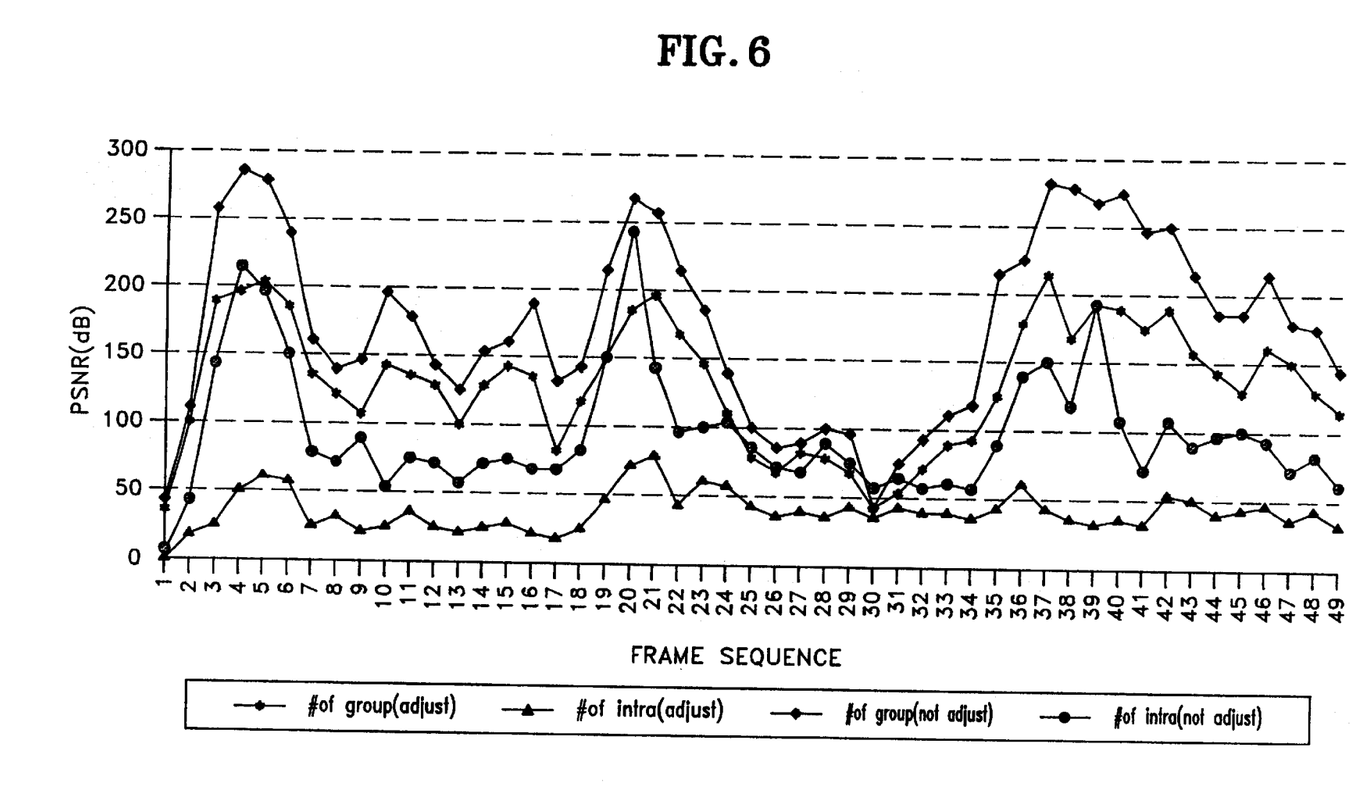
FIG. 6 is a drawing for illustrating the generated bit quantities one of which is adjusted according to the motion estimating method of the present invention, and the other of which is not adjusted, to the apparatus shown in FIG. 2.

FIG. 6 is a drawing for illustrating the generated bit quantities one of which is adjusted according to the motion estimating method of the present invention to the apparatus shown in FIG. 2, and the other of which is not adjusted. The greater the number of the estimated group is and the higher the ratio of the intra-block is, the more the bit generation quantity is. The used motion image is an image "salesman" having the size of 360×288 per frame. Each frame image has been sampled by 10 MHz and the resolution of each pixel is eight bits.

As described above, the present invention has the effect that a motion estimation according to the MCIC type shown in FIG. 1, can correctly be made even when a light source is varied or a luminance signal is varied due to the moving of an object.

In addition, the present invention results in reducing the number of groups and reduces the number of intra-blocks having a large quantity of information compared to the block where the motion estimation is possible in the motion image encoding according to OOC type shown in FIG. 2, so that an outstanding effect is achieved in view of image quality and the quantity of information generation.

What is claimed is:

1. A method for estimating a motion by dividing an image frame represented by a luminance signal into a plurality of predetermined size blocks and for detecting a most similar block in a previous frame with a block in a current frame and producing a corresponding movement distance as a motion vector, comprising the steps of:

producing a mean value of the luminance signal with regard to a block of the current frame;

producing a mean value of the luminance signal with regard to a block to which a motion estimation of the previous frame is applied;

compensating the luminance signal of the block to which the motion estimation of the previous frame is applied such that the first and second mean values are equal to each other; and selecting a block having the minimum sum of differences between the luminance signals of each pixel, with regard to the block of the current frame and the block to which a motion estimation of the previous frame is applied, respectively, and producing a movement distance between these blocks as a motion vector.

2. A method for estimating a motion according to claim 1, wherein, in said compensating step, the difference between the first and second mean values is added to the pixel values of the block to which a motion estimation of the previous image is applied.

* * * * *